United States Patent
Ding et al.

(10) Patent No.: US 10,509,878 B1
(45) Date of Patent: Dec. 17, 2019

(54) SYSTEMS AND METHODS FOR ROUTING TRACK ASSIGNMENT

(71) Applicant: Cadence Design Systems, Inc., San Jose, CA (US)

(72) Inventors: Yi-Xiao Ding, Austin, TX (US); Zhuo Li, Austin, TX (US); Wen-Hao Liu, Cedar Park, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 77 days.

(21) Appl. No.: 15/688,730

(22) Filed: Aug. 28, 2017

(51) Int. Cl.
*G06F 17/50* (2006.01)
*G06F 1/10* (2006.01)

(52) U.S. Cl.
CPC ............ *G06F 17/5031* (2013.01); *G06F 1/10* (2013.01); *G06F 17/5036* (2013.01); *G06F 17/5077* (2013.01); *G06F 2217/84* (2013.01)

(58) Field of Classification Search
CPC .... G06F 17/5031; G06F 1/10; G06F 17/5036; G06F 17/5077; G06F 2217/84
See application file for complete search history.

(56) References Cited

U.S. PATENT DOCUMENTS

| | | | | |
|---|---|---|---|---|
| 5,841,664 A * | 11/1998 | Cai | ...................... | G06F 17/5077 716/130 |
| 8,566,771 B1 * | 10/2013 | Arp | ...................... | G06F 17/5077 716/119 |
| 9,153,531 B1 * | 10/2015 | Roth | ................. | H01L 21/76838 |
| 9,213,793 B1 * | 12/2015 | Salowe | ............... | G06F 17/5077 |
| 9,396,301 B1 * | 7/2016 | Lee | ....................... | G06F 17/5077 |
| 9,564,394 B1 * | 2/2017 | Roth | ....................... | G06F 17/5077 |
| 9,652,579 B1 * | 5/2017 | Arkhipov | ............. | G06F 17/5081 |
| 9,904,756 B1 * | 2/2018 | Ruehl | .................. | G06F 17/5081 |
| 10,192,018 B1 * | 1/2019 | Gerousis | .............. | G06F 17/5072 |
| 10,192,019 B2 * | 1/2019 | Chang | .................. | G06F 17/5077 |
| 2011/0014786 A1 * | 1/2011 | Sezginer | .............. | G06F 17/5077 438/618 |
| 2011/0041112 A1 * | 2/2011 | Kuppuswanny | ..... | G06F 17/5077 716/130 |
| 2011/0055790 A1 * | 3/2011 | Gao | ..................... | G06F 17/5077 716/130 |
| 2011/0154282 A1 * | 6/2011 | Chang | .................. | G06F 17/5068 716/120 |

(Continued)

OTHER PUBLICATIONS

Wong, Man-Pan, et al., "Negotiation-Based Track Assignment Considering Local Nets", 21st Asia and South Pacific Design Automation Conference (ASP-DAC), Macau (2016), 6 pgs.

*Primary Examiner* — Nha T Nguyen
(74) *Attorney, Agent, or Firm* — Schwegman Lundberg & Woessner, P.A.

(57) ABSTRACT

Systems, methods, media, and other such embodiments are described for routing track assignment in a circuit design. One embodiment involves accessing routing data for a circuit design, and a first wire of a plurality of wires in the routing data. A second wire is identified that is related to the first wire as a parent wire along a shared routing direction. A misalignment value is calculated for the first wire and the second wire, and a new routing placement is selected for the first wire based at least in part on the misalignment value. In some embodiments, all wires in various routings of a circuit design are checked for possible misalignment in order to improve slew performance via reduction of unnecessary vias.

20 Claims, 11 Drawing Sheets

(56) References Cited

U.S. PATENT DOCUMENTS

| | | | |
|---|---|---|---|
| 2012/0137264 A1* | 5/2012 | Chang | G06F 17/5077 |
| | | | 716/131 |
| 2013/0019220 A1* | 1/2013 | Maruyama | H01J 37/3174 |
| | | | 716/126 |
| 2014/0115546 A1* | 4/2014 | Wang | G06F 17/5068 |
| | | | 716/55 |
| 2015/0089465 A1* | 3/2015 | Chang | G06F 17/5077 |
| | | | 716/112 |
| 2015/0100938 A1* | 4/2015 | Lu | G06F 17/5077 |
| | | | 716/131 |
| 2016/0117432 A1* | 4/2016 | Yuan | G06F 17/5077 |
| | | | 716/52 |
| 2017/0032073 A1* | 2/2017 | Chen | G06F 17/5077 |
| 2017/0300608 A1* | 10/2017 | Narisetty | G06F 17/5077 |
| 2017/0316143 A1* | 11/2017 | Lu | G06F 17/5077 |
| 2018/0075181 A1* | 3/2018 | Chang | G06F 17/5077 |
| 2018/0285508 A1* | 10/2018 | Pandey | G06F 17/5077 |
| 2018/0314785 A1* | 11/2018 | Schultz | G06F 17/5077 |

\* cited by examiner

SYSTEMS AND METHODS FOR ROUTING TRACK ASSIGNMENT

TECHNICAL FIELD

Embodiments described herein relate to electronic design automation (EDA), and to systems, methods, devices, and instructions for generating circuit designs, including generating or updating routing placement of wires to reduce misalignment and improve slew rate performance.

BACKGROUND

Electronic design automation (EDA) is a category of systems for assisting with the design of electronic systems and devices. Large, integrated circuit designs are often assembled from previously designed blocks. This enables reduced turnaround times for generation of an integrated circuit. Automated design of routing connections between individual circuit elements or design blocks is also part of such EDA system operations. Schematic and layout information for such block portions of a design may be exchanged or licensed as intellectual property. Timing analysis is an EDA verification analysis whereby the timing of circuit elements and/or circuit blocks is analyzed to verify that the design meets constraints in order to operate at intended clock rates in an expected operating environment.

BRIEF DESCRIPTION OF THE DRAWINGS

Various ones of the appended drawings merely illustrate example embodiments of the present disclosure and should not be considered as limiting its scope.

DETAILED DESCRIPTION

Embodiments described herein relate to electronic design automation (EDA) and to methods, computer media, and devices used for analyzing, optimizing, and creating electronic circuits. One of the many complex elements of circuit design is the generation of routing trees that convey a signal from a signal origin, or source, to a signal destination, or sink. A clock tree, for example, may have a single source, with hundreds or thousands of destination sinks. Similarly, power may be routed to different circuit elements via routing trees or routing networks.

In some systems, routing is solved in three stages with global routing, track assignment, and detail routing. Track assignment tries to assign wires from a global routing solution to tracks (e.g., lines in a grid). The track assignments may include objectives to limit total wire length and reduce wire overlap. Optimizing around wire length and wire overlap, however, may not necessarily generate a good solution quality in terms of timing values, such as slew pin violations. Embodiments described herein consider wire misalignment in track assignments for wire placement (e.g. routing placement) along with other optimization objectives (e.g., wire length and wire overlap). Reduction of misalignment in various embodiments described below provides various benefits including reduction in vias and improved performance of some timing values (e.g., slew performance), and allows long wires, which provide better placement guidance during detail routing as part of track alignment based systems.

Some embodiments operate by determining misalignment and computing an alternate placement of wires within a track structure on a per-wire basis. During an initial placement of wires, alignment is considered as part of decision making for wire placement. Additionally, after all wires are placed, an additional evaluation of misalignment is performed. If misalignment is identified, the placement is adjusted (e.g., by rip-up and re-assignment of initial wire placement) to improve alignment.

Figure 1:
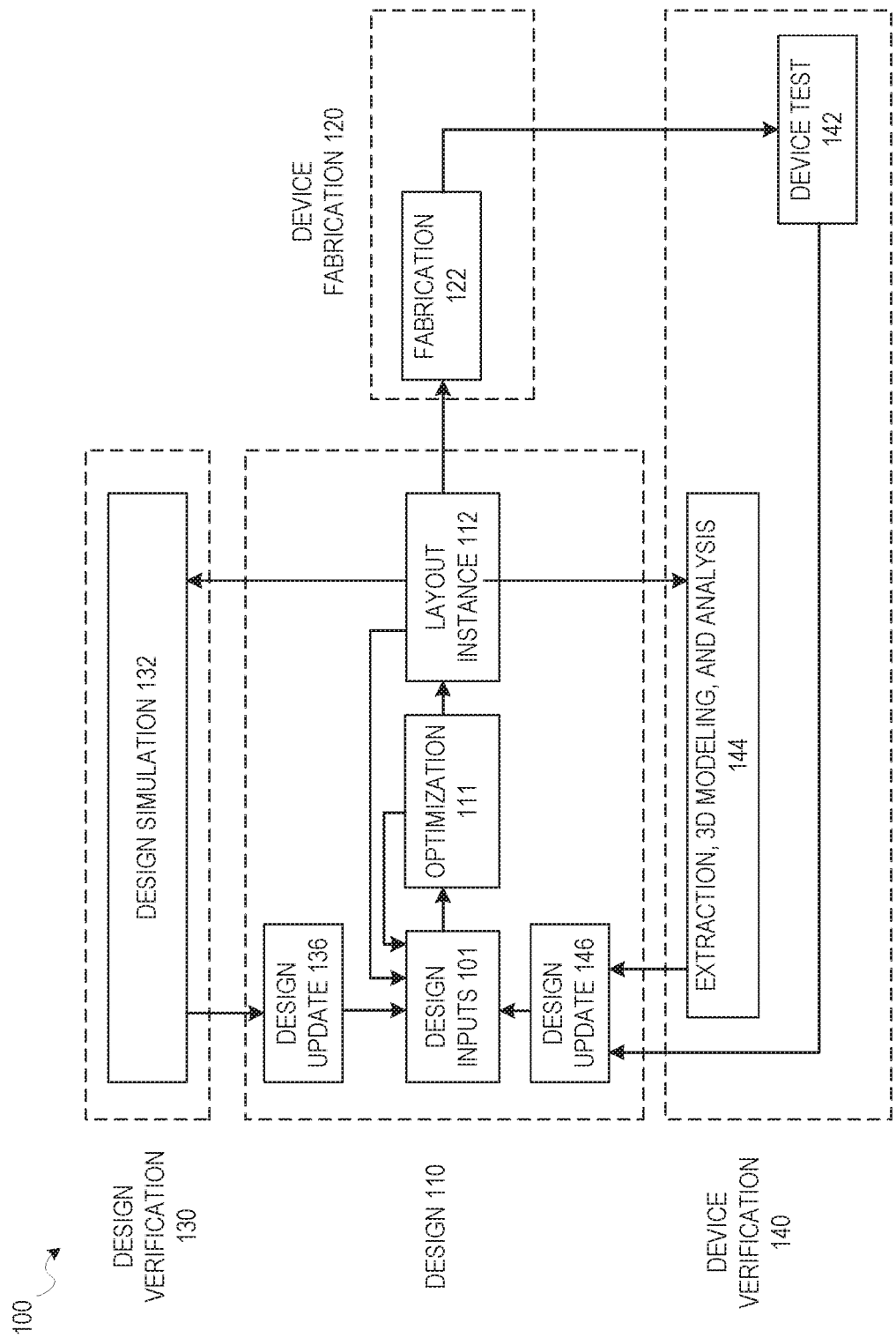
FIG. 1 is a diagram illustrating one possible design process flow which includes elements for routing track assignment in accordance with some embodiments.

FIG. 1 is a diagram illustrating one possible design process flow 100 which includes elements that involve routing track assignment as part of routing for some circuit designs that are generated in accordance with embodiments described herein. This includes possible design process flows for considering misalignment during an initial placement of wires along a routing track, as well as considering misalignment as part of a review of wire placement. In some embodiments, misalignment is considered automatically. In other embodiments, operations to review and update routing track assignment for wires are performed in response to a design not meeting timing thresholds (e.g., slew rate performance). It will be apparent that other design flow operations may function using the timing constraints and optimizations described herein, but the design flow 100 is described here for the purposes of illustration.

As illustrated, the overall design flow 100 includes a design phase 110, a device fabrication phase 120, a design verification phase 130, and a device verification phase 140. The design phase 110 involves an initial design input operation 101 where the basic elements and functionality of a device are determined, as well as revisions based on various analyses and optimization of a circuit design. This design input operation 101 is where initial layouts of circuit elements requiring routing structures to connect them are generated, before adjustments are made to improve a design according to various criteria (e.g., wire length, misalignment, skew, slew rates, etc.). In various embodiments, adjustments to a routing may be made at any time during generation of a circuit design, with adjustments subject to analysis for misalignment and possible improvements to misalignment within the defined limitations of a given circuit design. The initial strategy, tactics, and context for the device to be created are also generated in the design input operation 101, depending on the particular design algorithm to be used.

In some embodiments, following an initial selection of design values in the design input operation 101, updates to an initial routing structure may be generated in accordance with various embodiments described herein during an optimization operation 111 or a layout instance 112, along with any other automated design processes. As described below, design constraints (e.g., blocking elements, threshold values for misalignment, etc.) for a routing may be provided with design inputs in the design input operation 101, and then may be analyzed according to various embodiments described below.

While the design flow 100 shows such optimization occurring prior to the layout instance 112, updates to a routing structure may be performed at any time to improve expected operation of a circuit design. For example, in various embodiments, constraints for blocks in a circuit design may be generated or updated prior to routing of connections in the circuit design, after routing, during register transfer level (RTL) operations, or as part of a final signoff optimization or verification prior to a device fabrication operation 122. In response to such updates, changes may be made to routing structures, and such changes may be reviewed for misalignment. Certain embodiments of operations described herein for generating and updating a routing structure may therefore involve iterations of the design input operation 101, optimization operation 111, and layout instance 112 generation. In other systems, other design processes may be used.

After design inputs are used in the design input operation 101 to generate a circuit layout, and any optimization operations 111 are performed, a layout is generated in the layout instance 112. The layout describes the physical layout dimensions of the device that match the design inputs. This layout may then be used in a device fabrication operation 122 to generate a mask associated with device fabrication and generate a physical device. Alternatively, additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

As described in more detail below, design updates 136 from design simulation 132 operations; design updates 146 from device test 142 or extraction, 3D modeling, and analysis 144 operations; or a direct design input operation 101 may occur after an initial layout instance 112 is generated. In various embodiments, whenever design inputs are used to update or change an aspect of a circuit design, a timing analysis and optimization operation 111 may be performed, and associated modifications to the design made (e.g., including modifications to routing structures which are reviewed for misalignment and adjustments to reduce misalignment in accordance with embodiments described herein).

Figure 2:
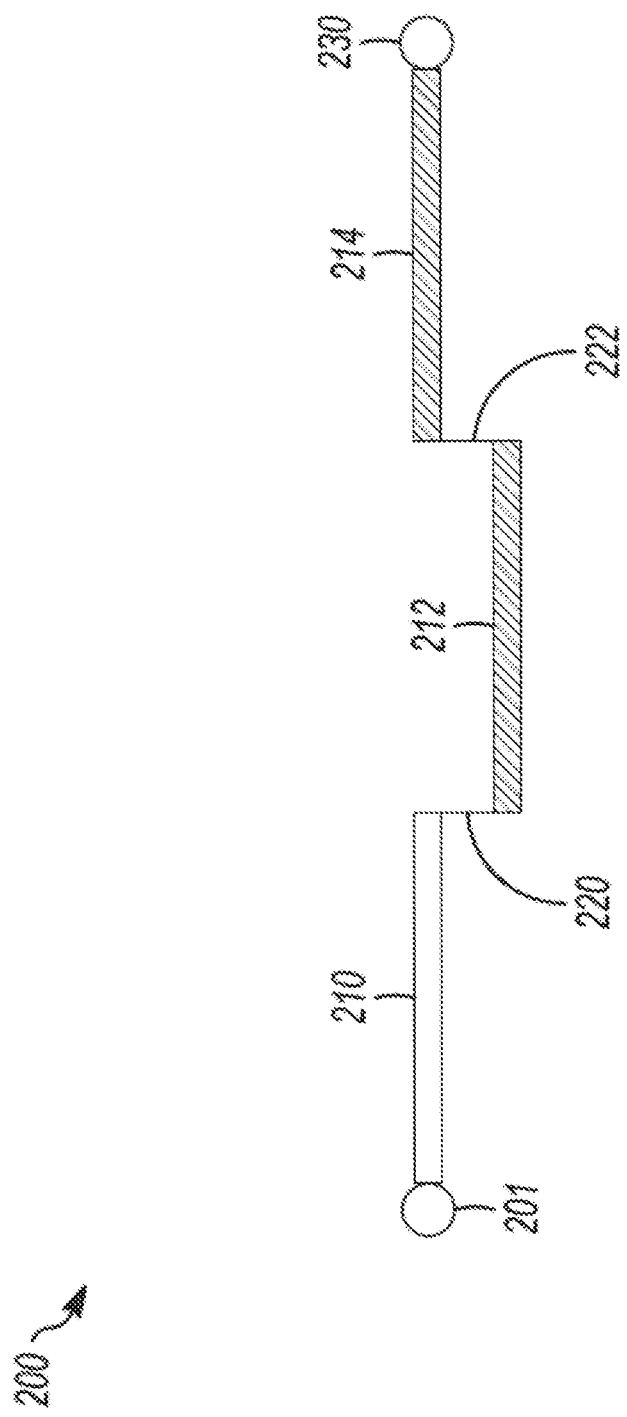
FIG. 2 illustrates aspects of misalignment in a routing in accordance with some embodiments.

FIG. 2 illustrates aspects of misalignment in a routing in accordance with some embodiments. FIG. 2 shows a simple routing 200 with a source 201 connected to a sink 230 via wires 210, 220, 212, 222, and 214. These wires are placed on routing tracks in a grid pattern in order to simplify the routing procedure (e.g., as opposed to free routing that may place diagonal routes or horizontal/vertical routes at any position instead of on defined tracks). The wires 210 and 214 are on the same track, and the wire 212 is on a track parallel to the track containing the wires 210 and 214. The wires 210, 212, and 214 share a first alignment direction to convey a signal from the source 201 toward the sink 230 along the first alignment direction. The wires 220 and 222 are on separate tracks and share a second alignment direction that is perpendicular to the first alignment direction. The misalignment may be seen in that the wires 210, 212, and 214 traverse a length toward the sink 230 but are separated from each other by the perpendicular wires 220 and 222. Analysis of the wires 210, 212, and 214 would identify options to reduce misalignment by placing some or all of these wires on the same track. Additionally, since the wires 220 and 222 are positioned such that they backtrack on each other, they add additional wire length to the routing 200 from the source 201 to the sink 230 as part of the misalignment, and add additional vias (e.g. an element used to connect wires on different routing layers, such as wires 210 and 220) that can be removed at the connection points between the wires as part of alignment. In various embodiments, the misalignment may be characterized in different ways. In some embodiments, the misalignment is identified by the length of the misaligned wires, such that the misalignment for the routing 200 will be the length of the wire 212 plus the length of the wire 214. Misalignment may also be characterized by a number of excess vias. In the routing 200, four extra vias would be present at the two ends of the wires 220 and 222 that are eliminated by placing the wires 210, 212, and 214 on the same track (e.g., due to the source 201 and the sink 230 being present on the same track). If the source 201 and the sink 230 were on different horizontal tracks, at least one vertical wire (e.g., a wire in the second alignment direction) would be needed to connect them, and only two vias would be eliminated by alignment of the wires 210, 212, and 214. This reduction assumes that some wires would be on the same routing layer. In other embodiments, the reduction may not be generated if the aligned wires are on different routing layers. In such embodiments, additional perpendicular wires will still be eliminated even if the vias remain.

Figure 3:
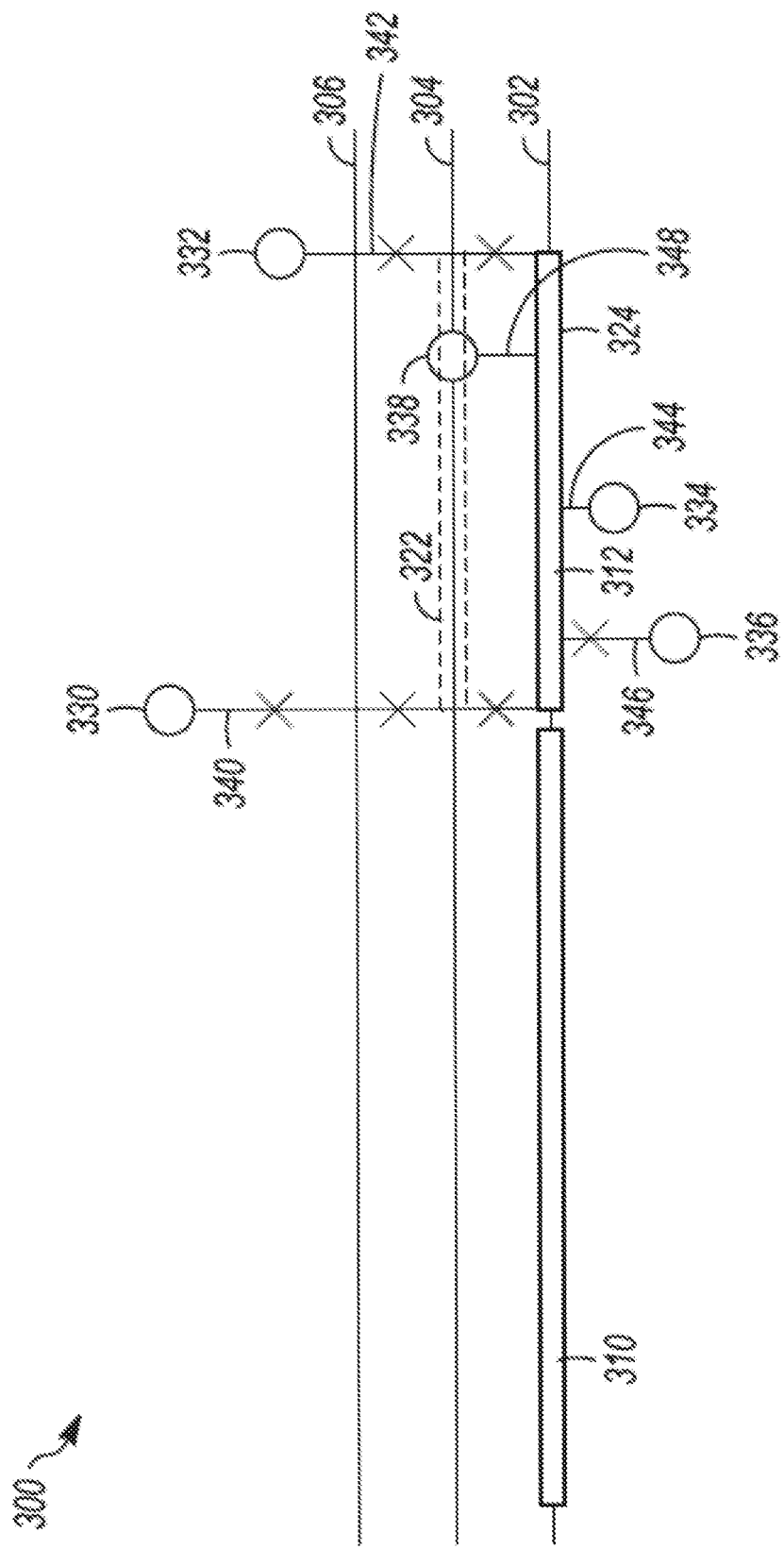
FIG. 3 illustrates aspects of misalignment in a routing in accordance with some embodiments.

FIG. 3 illustrates aspects of misalignment in a routing 300 in accordance with some embodiments. FIG. 3 includes wires 310, 312, 340, 342, 344, 346, and 348 and pins 330, 332, 334, 336, and 338. FIG. 3 shows tracks 302, 304, and 306, which are part of a grid for a routing alignment system. The tracks 302, 304, and 306 run in a first alignment direction.

FIG. 3 further shows a first placement position 322 for the wire 312, and a second placement position 324 for the wire 312, with the wire 312 shown placed in the second placement position 324. A routing system targeted to minimize total wire length would place the wire 312 in the first placement position 322. This may, for example, be selected by an algorithm that places a wire at a track in the median track position between all pins to be connected to the wire. The track 304 is the track in the median position between the pins 338, 330, 332, 334, and 336 which are to be connected to the wire 312, and so an algorithm minimizing wire length would select the first placement position 322 on the track 304 for the wire 312. Such a placement may, however, create many short wires connecting other wires on different tracks, and may further cause slew pin violations of circuit design criteria.

Placing the wire 312 on the track 302 generates additional wire length, as the wires 340, 348, and 342 need to be extended as the wires 344 and 346 are shortened. This placement, however, aligns the wires 310 and 312 on the same track 302, and reduces the number of vias by one (e.g., the wire 340 is associated with one via instead of two when the wire 312 is aligned in the second placement position 324.)

Figure 4A:
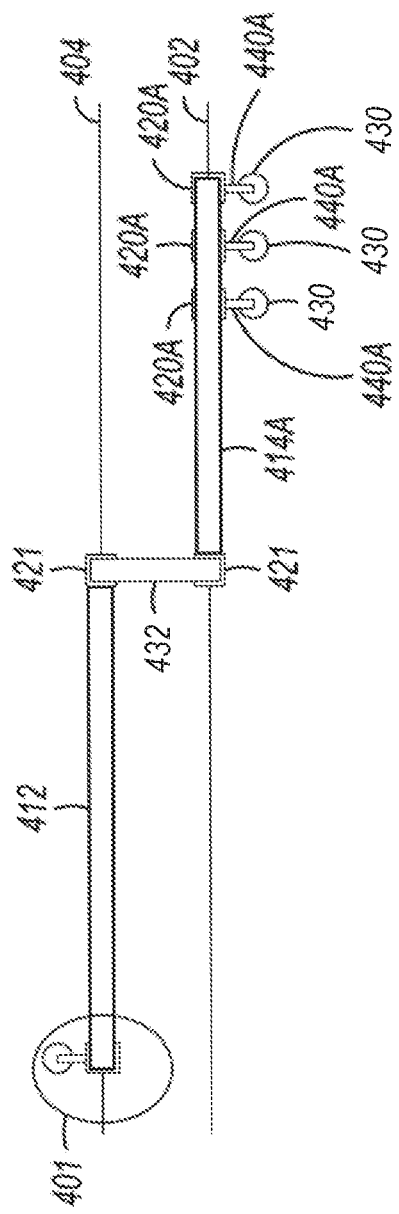
FIG. 4A illustrates aspects of misalignment in a routing in accordance with some embodiments.
Figure 4B:
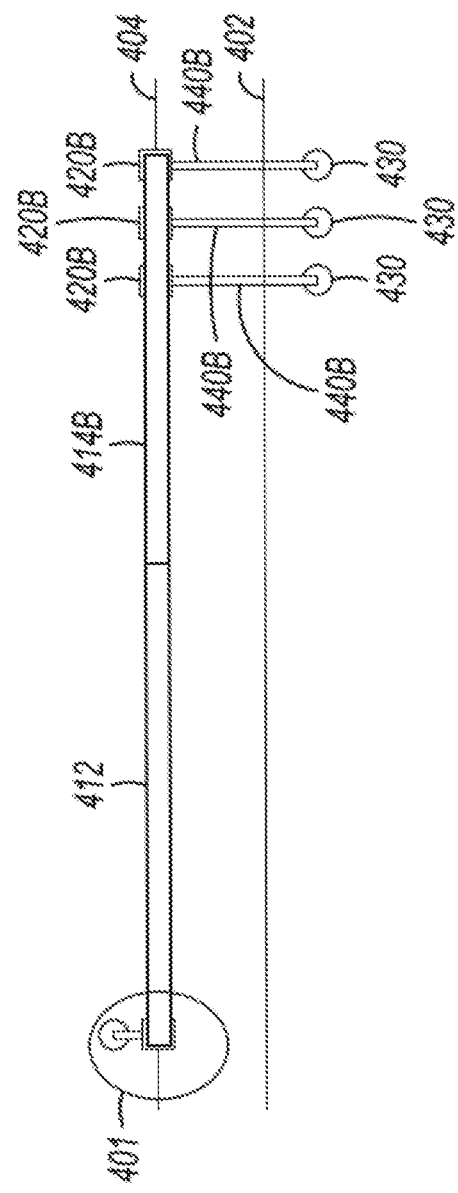
FIG. 4B illustrates aspects of routing track assignment to reduce misalignment in a routing in accordance with some embodiments.

FIG. 4A illustrates aspects of misalignment in a routing in accordance with some embodiments, and FIG. 4B illustrates aspects of routing track assignment to reduce misalignment in a routing in accordance with some embodiments. FIGS. 4A and 4B both show tracks 402 and 404, with a source 401 connected to a wire 412 which are both positioned on the track 404. In FIG. 4A, a wire 414A is placed on the track 402 to reduce the wire length of wires 440A connecting the wire 414A to pins 430 through vias 420A. This placement of the wire 414A, however, adds additional vias 421 as well as a wire 432.

By contrast, FIG. 4B shows wires 412 and 414B aligned, with wires 414B and vias 420B both moved from the track 402 to the track 404, and wires 440B extended with extra length beyond what was present in the wires 440A of FIG. 4A.

Figure 6:
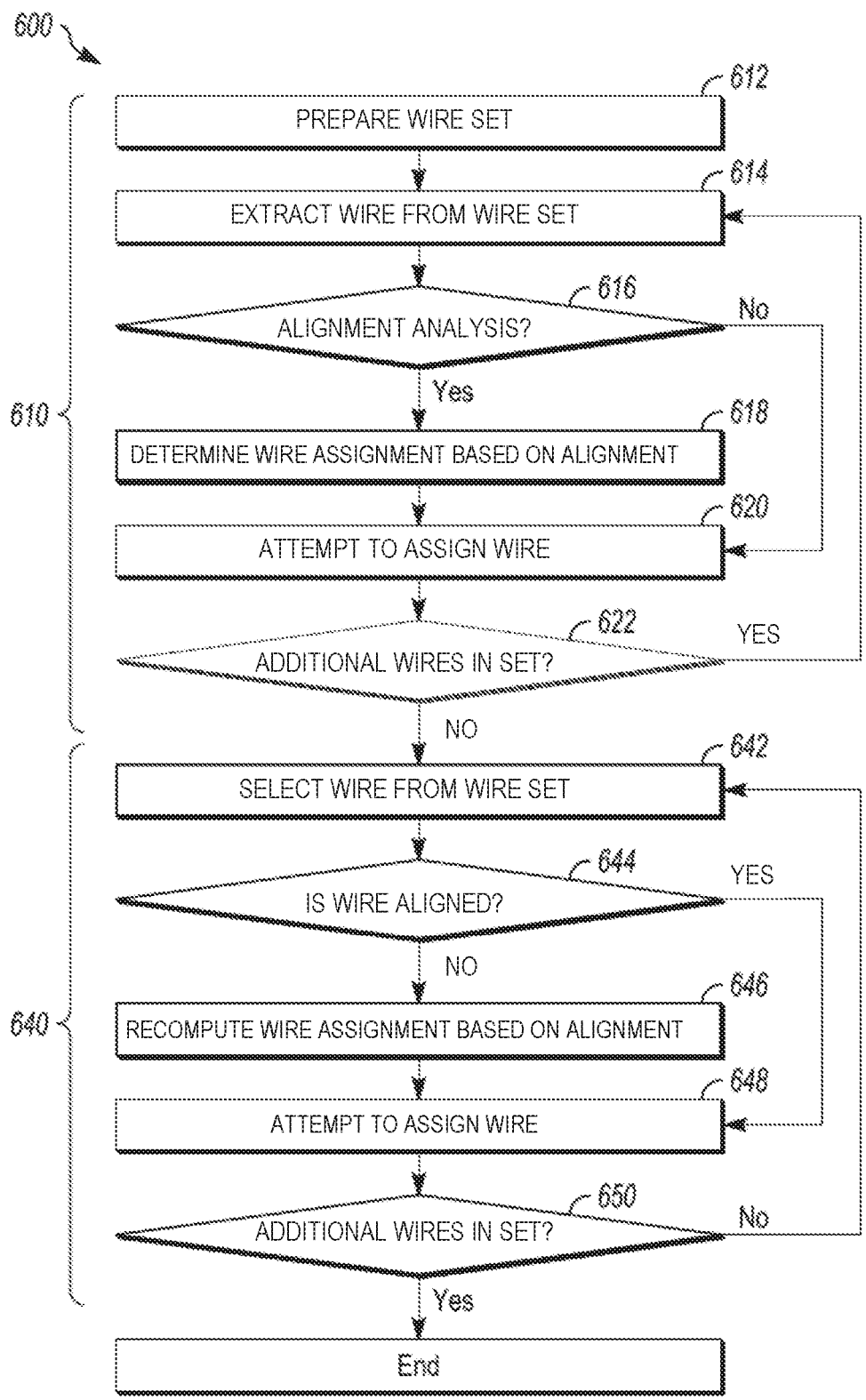
FIG. 6 describes a method for routing track assignment in accordance with some embodiments.

As described further below, particularly with respect to the methods 600 and 900 of FIGS. 6 and 9, a system may arrive at the routing of FIG. 4B in a variety of different ways. In some embodiments, an initial set of wires is generated by system design operations, and routing track assignment operations begin without the wires placed, the wires being placed by the routing track assignment operations one by one. If the wire 412 is placed before the wire 414B, then no wire is present to check alignment with as wire 412 is assigned a placement. Later, when the wire 414B is to be placed after the wire 412 has been assigned a placement, the procedures for selecting a placement position may account for misalignment, and select placement of the wire 414B on the track 404 over the track 402 to reduce misalignment rather than picking the track 402 to reduce wire length. Later analysis operations may determine to move both wires to the track 402 to reduce overall wire length, or the track 404 may be chosen over the track 402 for the aligned system for other reasons.

Figure 5A:
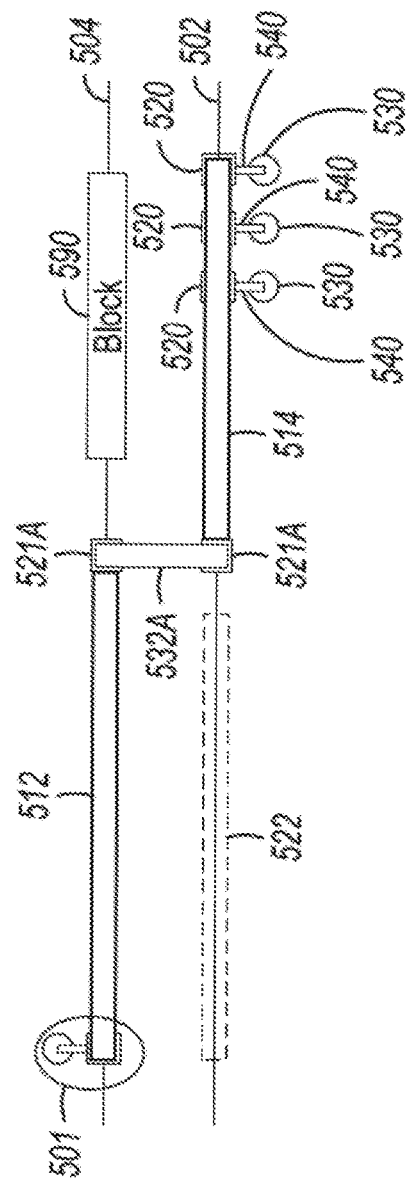
FIG. 5A illustrates aspects of misalignment in a routing in accordance with some embodiments.
Figure 5B:
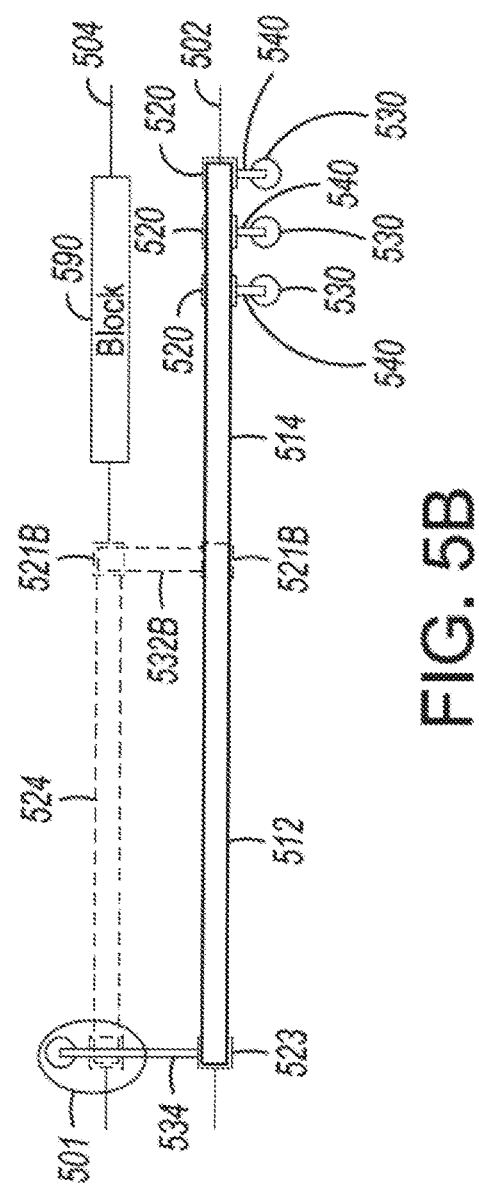
FIG. 5B illustrates aspects of routing track assignment to reduce misalignment in a routing in accordance with some embodiments.

FIG. 5A illustrates aspects of misalignment in a routing in accordance with some embodiments, and FIG. 5B illustrates aspects of routing track assignment to reduce misalignment in a routing in accordance with some embodiments. FIGS. 5A and 5B both include a source 501 connected to pins 530 via wires 512 and 514, vias 520, and wires 540. FIG. 5A shows a placement position 522 (which is the position of the wire 512 in FIG. 5B), vias 521A, and a connecting wire 532A. FIG. 5B shows a placement position 524 (which is the position of the wire 512 in FIG. 5A), removed vias 521B, and a removed wire 532B.

In an initial routing placement of FIG. 5A, a different result would occur compared with the process above for FIG. 4B due to the presence of a block 590. The block 590 may, for example, be any circuit elements assigned a placement which prevents the placement of wires in that area. In a process where routing assignments are not initially present, and the wire 512 is placed at the placement position 524 before the wire 514 is assigned a placement, again no misalignment is present due to the wire 514 not having a placement assigned to check for misalignment. Later, when the wire 514 is assigned a placement position, a track 504 may be considered for placement of the wire 514, but the block 590 prevents placement of the wire 514 on the track 504. While realignment of the wire 512 may be considered at the time when the wire 514 is placed, this may add additional undesirable complexity. Thus, in some embodiments, each wire is placed independently, resulting in an initial routing of FIG. 5A.

Later, in some embodiments, a review of wire placement is performed after all wires are assigned a position to check for misalignment, resulting in a change to the routing of FIG. 5A, shown in FIG. 5B. When the subsequent review analyzes the placement of the wire 512 in the placement position 524 after the wire 514 has been assigned a position, a misalignment is identified due to the wires 512, 514 being on separate tracks with a shared path distance to convey signals toward the pins 530. In some such embodiments, identification of the misalignment will then result in possible track assignments for the wire 512 being identified, with the placement position 522 selected to reduce the misalignment with the wire 514. After a decision is made by a computing system to move the wire 512 from the track 504 to a track 502, connecting wires and vias are adjusted, such that a wire 534 and a via 523 are added, and the unnecessary previous connections are removed, as shown by the removed vias 521B and the removed wire 532B FIG. 6 describes a method 600 for routing track assignment in accordance with some embodiments. In some embodiments, the method 600 is performed by a computing device with one or more processors. In some embodiments, the method 600 is embodied in computer-readable instructions stored in a non-transitory storage device, such that when the instructions are executed by one or more processors of a device, the device performs the associated method 600. The method 600 is shown as including steps 610 and 640. Step 610 includes operations for initial placement of wires in a wire network. Then, once all wires are assigned a position as part of step 610, the alignment of all wires is checked as part of step 640. In some embodiments, once an initial wire placement has been set, step 640 may be repeated any time adjustments are made to a wire network for any reason (e.g., inclusion of additional circuit elements, adjustment of a circuit area or shape, etc.).

Operation 612 involves accessing a wire set in preparation for routing track assignments for each wire in the wire set. In some embodiments, such as the example method 600, each wire is assigned separately, and connected to one or more previous wires as part of the assignment of a position for each wire. In other embodiments, other groupings of wire placement may be used. Additionally, as detailed above, a circuit design may include any number of routing networks (e.g. wire networks), and so the method 600 may be repeated for each wire network, or variations of different wire assignment methods may be used for different wire networks depending on the design criteria for each wire network. As part of operation 612, processing or other preparation of the wire data that describes the wire set may be performed to format or otherwise place the data in a position to be processed and used for assigning positions for each wire.

A first wire is then selected from the wires of the wire set in operation 614. In some embodiments, the wires are selected in order from a source to sinks, with branches selected in an ordered fashion. In other embodiments, any path from a first circuit element to a second circuit element is selected until all routes have been placed. In other embodiments different orders may be selected. In one embodiment, the order of extracting wires is based on selecting the longest wire from wires of the wireset, with the parent child ordering independent of the selection order of wires.

Once a wire is selected in operation 614, a parent wire is identified, if any exists, in operation 616. A parent wire is a wire running along the same direction as the selected wire in order to progress a signal from one point to another. A parent wire for a selected wire may also be identified, in some embodiments, as a wire that shares a first alignment direction with the selected wire, wherein a first end of the parent wire shares a position with a second end of the selected wire along a second alignment direction perpendicular to the first alignment direction, such that the selected wire and the parent wire are configured to carry a signal from the first circuit element toward the second circuit element along the first alignment direction. For example, in FIG. 4A, the end of the wire 412 at a first via of the vias 421 and the end of the wire 414A at the other via of the vias 421 are both along the line containing the wire 432, which is perpendicular to the tracks 404 and 402. The wires 412 and 414A are configured to progress a signal from the source 401 toward the pins 430. The wire 412 is a parent wire for the wire 414A. Similar relationships may be seen in wires of all embodiments described herein.

A parent wire may not be identified in operation 616 (e.g., the "no" path) if the selected wire is directly connected to a circuit element (e.g., a source, a signal or voltage pin, or any other such circuit element) or if the wire that will be a parent wire has not been assigned a routing placement yet. If no parent wire is identified for the wire selected in operation 614, then the method 600 proceeds to operation 620, and a routing track assignment (e.g., placement) is set for the selected wire. Situations where an assignment cannot be made generate an error. If a parent wire is identified in operation 616, then in operation 618, a misalignment value is calculated for the selected wire and the parent wire (e.g. a second wire separate from the first selected wire). A child wire is similarly a wire related to a wire as described above for a parent, but in the other direction, such that the selected wire above is the child wire to the parent wire. In some embodiments, additional criteria are used. For example, a wire may have a threshold length above which a misalignment value is not determined. As part of operation 618, in some embodiments, multiple track placement options are identified, and one or more performance values calculated for each placement option. The performance values may be an associated wire length, an associated change in the number of vias, an associated misalignment value, or any other such performance values. Then, in operation 620, the selected wire is placed using the available information to select a placement position with associated performance characteristics or values that are identified as preferable. In some embodiments, weighted formulas may be calculated from multiple performance values for multiple possible placement positions. In some embodiments, an algorithm prioritizing certain performance characteristics is used. For example, if alignment is prioritized, and two placement positions with the same alignment values exist, then wire length for the two placement options may be compared, and the option with the lower wire length value selected. In operation 622, a check is performed to determine if any wires have not been selected and considered as part of step 610. If any wires remain, the process repeats back to operation 614. If no wires remain, step 610 is completed.

Once step 610 is completed, the alignment is checked for each wire as part of step 640. In operation 642 of step 640, a wire is selected from the wires in the set. If wires of the set have previously been considered as part of step 640, a new wire is selected until all wires of the set under consideration have been analyzed. In operation 644, an alignment is checked (e.g., a misalignment is calculated) for the selected wire and any parent or child wire (e.g., any wire on the same track or in the same alignment direction and directly connected via a perpendicular connecting line as described for parent/child wires above) on the same alignment direction. If multiple wires are connected to a selected wire, a selected wire may have multiple parent or child wires to be analyzed for misalignment. If there is no misalignment, the selected wire is reassigned to the previous position at operation 648. If a misalignment is identified, then in operation 646, alternative placement positions are identified, and performance values, including at least the misalignment values, are determined for each possible placement position. In operation 648, a routing placement is selected based on the misalignment values of the possible placement positions. In operation 650 a determination is made as to whether any wires have not been selected and considered as part of step 640. Step 640 repeats operations 642 through 650 until all wires of the set have been checked for misalignment, and then the process ends.

Returning to the example routings of FIG. 4B and applying the method 600 for a simple set of wires including the wires 412 and 414B, step 610 may include selection of the wire 412, determination that the wire 412 has no parent, and placement of the wire 412. Selection of the wire 414B is followed by identification of the wire 412 as a parent, identification of possible placement positions on the tracks 404 and 402, and selection of a routing placement on the track 404. With no more wires remaining, step 610 ends. Each wire of the set is then analyzed in step 640, which results in no misalignment being identified, and the method 600 ending.

Similarly, applying the method 600 to FIGS. 5A and 5B results in an intermediate routing of FIG. 5A following step 610, and a final routing of FIG. 5B following step 640. In contrast with the above, applying operations 612-620 to the wire 514 results in the wire 514 being placed on the track 502 due to the block 590. During step 640, a misalignment will be identified, and analysis of placement positions results in the routing illustrated in FIG. 5B.

Figure 7:
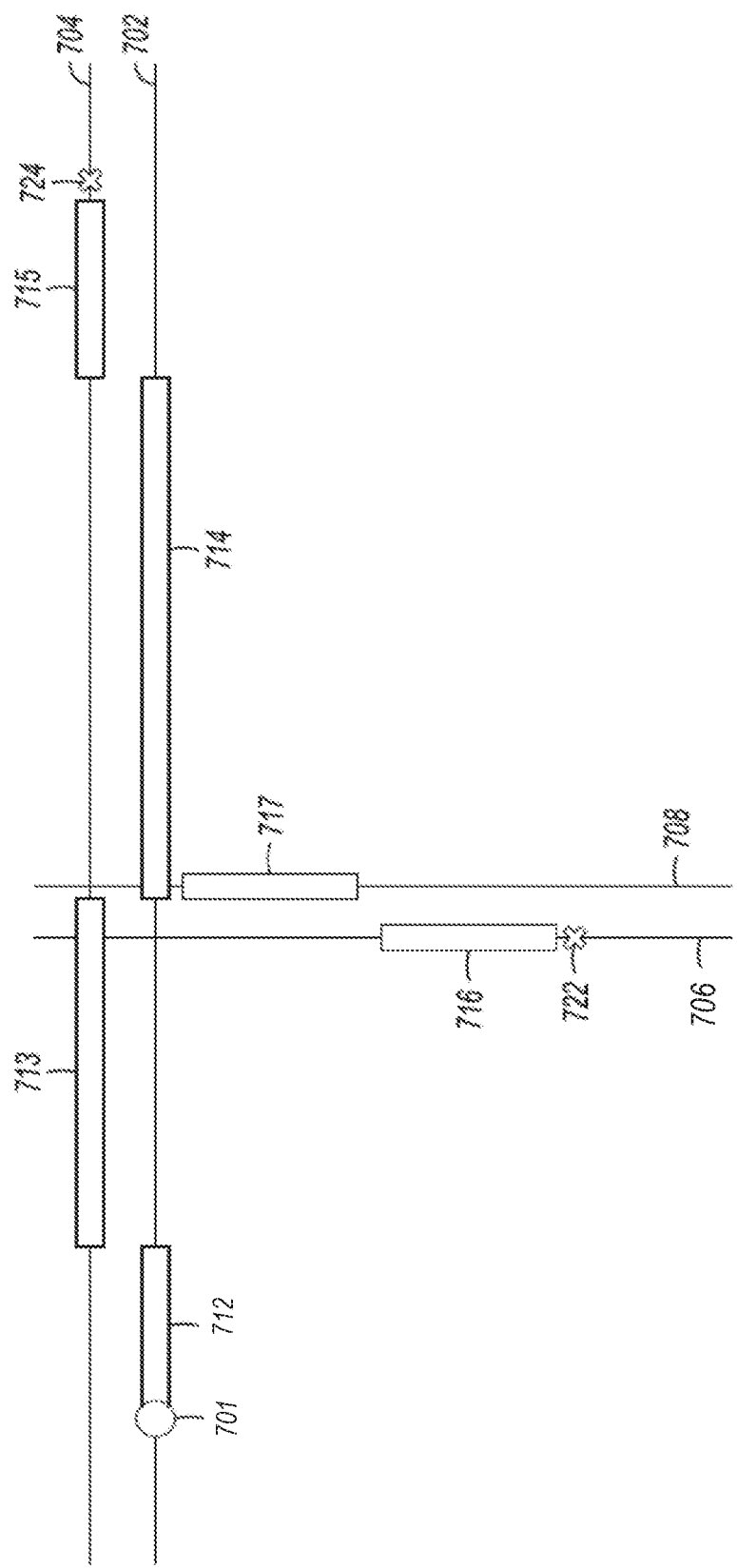
FIG. 7 illustrates aspects of misalignment in a routing in accordance with some embodiments.

FIG. 7 illustrates aspects of misalignment in a routing in accordance with some embodiments. The example embodiments above describe alignment for a single alignment direction on a single layer of a circuit. Complex circuit designs may include multiple routing layers, and particularly may include related routing layers with tracks running in perpendicular directions. FIG. 7 illustrates misalignment on two layers with wires running in two different alignment directions. Alignment checks are performed on all such wires in certain example embodiments, with adjustments made as needed to connect wires after alignment changes are made to a routing.

FIG. 7 shows adjacent tracks 702 and 704 running in a first alignment direction, and adjacent tracks 706 and 708 running in a second alignment direction perpendicular to the first alignment direction. FIG. 7 additionally shows wires 712-717 in positions shown. An associated circuit design includes source 701 and sinks 722 and 724 which are to be connected with wires positioned along the tracks. Table 1 illustrates certain characteristics of the routing of FIG. 7 along with misalignment values.

TABLE 1

| Wire name | length | Parent wire | misalignment |
|---|---|---|---|
| 712 | 1 | NA | 0 |
| 713 | 2 | 712 | 2 |
| 714 | 3 | 713 | 0 (too long wire) |
| 717 | 1 | 713 | 0 |
| 716 | 1 | 717 | 1 |
| 715 | 1 | 714 | 1 |

Table 1 shows a length value for each wire of FIG. 7, an identified parent wire for each wire (if any), and a misalignment value for each wire. The system analyzing the routing of FIG. 7 includes a length threshold of "3", such that wires with a length equal to or greater than three are not considered for misalignment. In various embodiments, any such threshold or no such threshold may be used, depending on the particular criteria for a circuit design or design process flow. Such values may be used in selecting between possible track assignment positions as part of track assignment to account for misalignment in accordance with embodiments described herein.

In some embodiments, for a given netlist describing a set of wires in one or more wire networks net_i, a misalignment value may be determined for each wire as follows:
Total misalignment=0
for each net_i in netlist do
    for each wire_j in the net_i do
    if wire_j needs to be aligned // wire_j's length is less than a threshold width
      Find wire_j's parent wire_k
      if wire_j and wire_k are both in the horizontal direction and on the same layer
        if wire_j and wire_k are not assigned to the same track
        total misalignment+=wire_j's length
      endif
    endif
if wire_j and wire_k are both in the vertical direction and on
    the same layer if wire_j and wire_k are not assigned to the
    same track total misalignment+=wire_j's length
    endif
endif
endif In other embodiments, other such methods may be used for determining a misalignment, and various other criteria may be used for limiting wires to be analyzed for misalignment.

Figure 8A:
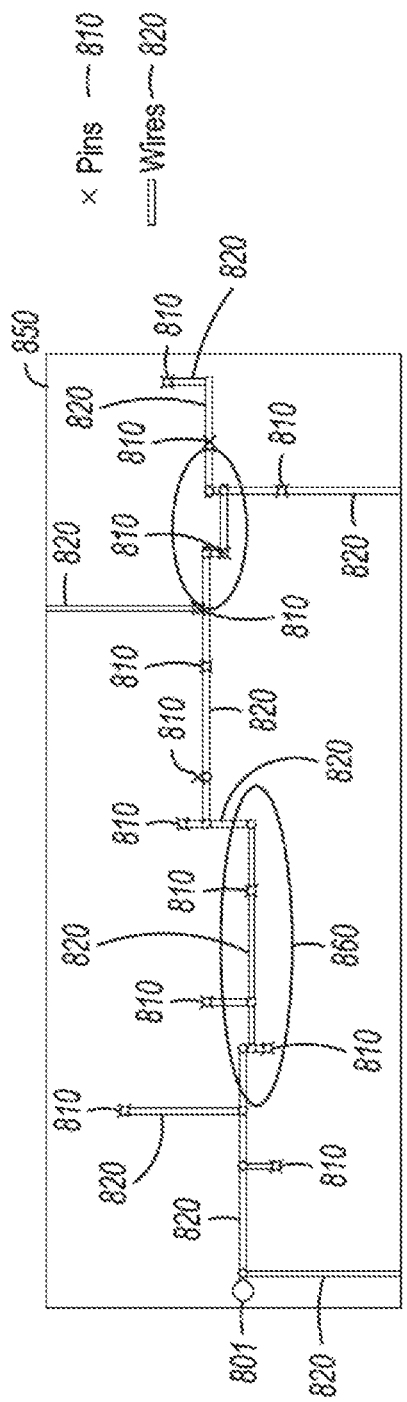
FIG. 8A illustrates aspects of misalignment in a routing in accordance with some embodiments.
Figure 8B:
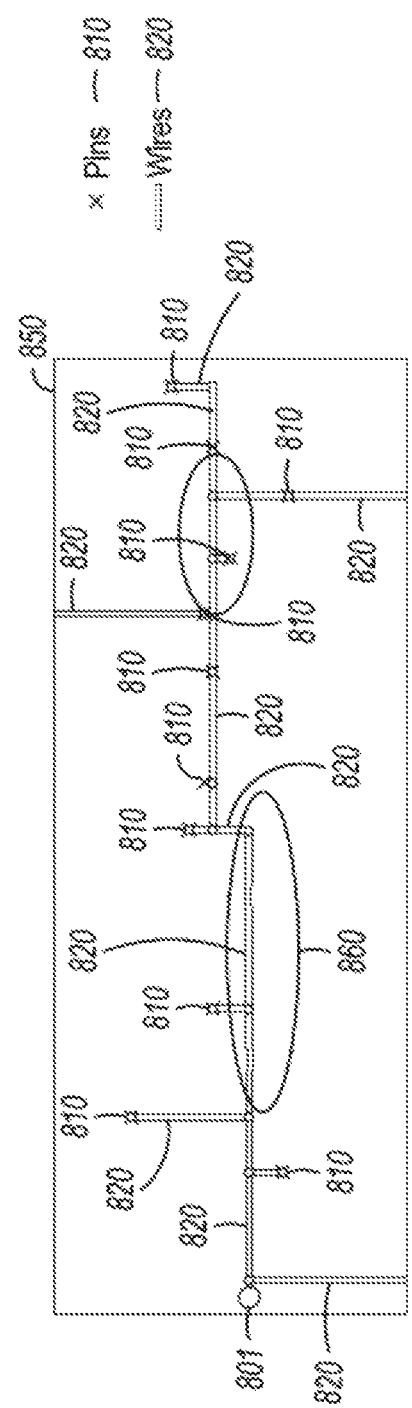
FIG. 8B illustrates aspects of routing track assignment to reduce misalignment in a routing in accordance with some embodiments.

FIG. 8A illustrates aspects of misalignment in a routing in accordance with some embodiments, and FIG. 8B illustrates aspects of routing track assignment to reduce misalignment in a routing in accordance with some embodiments. FIGS. 8A and 8B illustrate a source 801 connected to a plurality of pins 810 via wires 820. In areas 860 and 850, wires of the wires 820 are aligned to achieve a slew performance value improvement. As described above, each wire of the wires 820 is analyzed to determine a misalignment with related wires in a shared alignment direction, with adjusted placement options considered and selected to reduce misalignment. In some systems, significant percentages of vias may be reduced, and significant slew performance increases seen due to such alignment processes.

Figure 9:
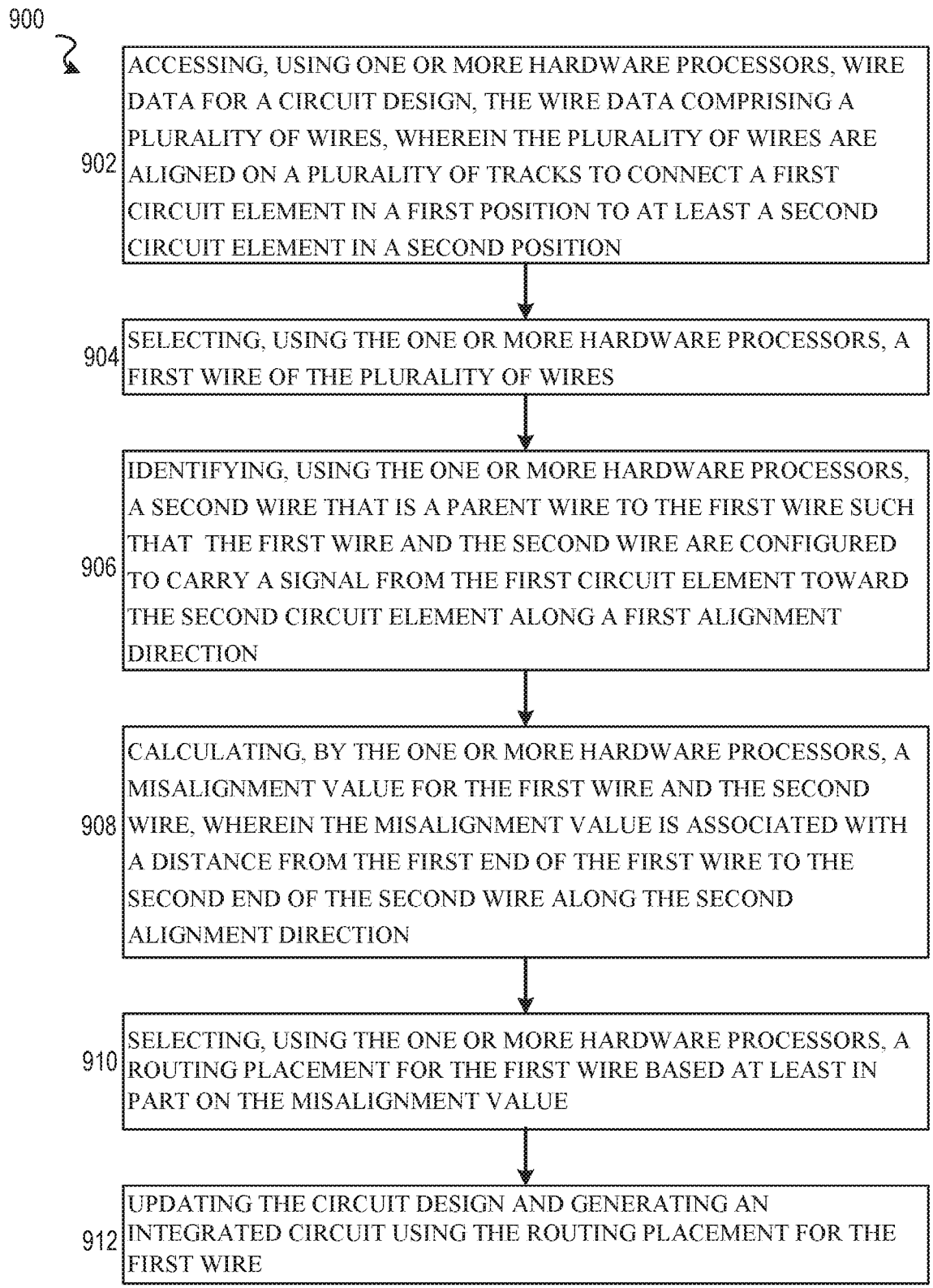
FIG. 9 describes a method for routing track assignment in accordance with some embodiments.

FIG. 9 describes a method 900 for routing track assignment in accordance with some embodiments. In some embodiments, the method 900 is performed by a computing device with one or more processors. In some embodiments, the method 900 is embodied in computer-readable instructions stored in a non-transitory storage device, such that when the instructions are executed by one or more processors of a device, the device performs the associated method.

The method 900 begins with operation 902 accessing, using one or more hardware processors, wire data for a circuit design, the wire data comprising a plurality of wires, wherein the plurality of wires are to be aligned on a plurality of tracks to connect a first circuit element in a first position to at least a second circuit element in a second position. The wire data may be information from a global routing operation input into track assignment and/or detail routing systems.

A first wire of the plurality of wires is then selected for placement in operation 904, and in operation 906, a second wire (e.g. a parent wire) associated with the selected wire is identified. The second wire shares a first alignment direction with the first wire, where a first end of the first wire shares a position with a second end of the second wire along a line with a second alignment direction perpendicular to the first alignment direction, such that the first wire and the second wire are configured to carry a signal from the first circuit element toward the second circuit element along the first alignment direction.

Following identification of the first and second wires, a misalignment value for the first wire and the second wire is calculated in operation 908, where the misalignment value is associated with a distance from the first end of the first wire to the second end of the second wire along the second alignment direction. A routing placement for the first wire based at least in part on the misalignment value is then identified in operation 910. In operation 912, the circuit design is updated using routing placements determined by misalignment values, and a circuit is generated using the updated circuit design.

The above is merely one example embodiment. Other process flows may be used based on the specific implementation of circuit generation in different embodiments.

As described above, various additional embodiments may operate in a variety of ways. In one embodiment, a second routing placement is identified for the second wire prior to selection of the first wire, wherein the second routing placement is selected to minimizing wire length. Another such embodiment involves storing an updated circuit design using the routing placement for the first wire in a memory coupled to the one or more hardware processors, where the routing placement for the first wire is generated as part of an initial routing for the circuit design; that is, routing placement is initial routing placement In some embodiments, the wire data comprises a netlist with routing placement for the plurality of wires from a global routing process, and in further such embodiments, routing placement for the plurality of wires is generated to minimize wire length, with the routing placement for the first wire based at least in part on the misalignment value being associated with an increased wire length and an improved slew performance value.

In some embodiments, blocking circuit elements are identified and used to determine the routing placement for the circuit design. Some such embodiments involve maintaining an initial placement for the first wire in response to identification of the blocking circuit element, identifying a plurality of updated routing placements for the first wire prior to selection of the routing placement, and calculating a misalignment value for each routing placement for the first wire of the plurality of updated routing placements to identify any aligned wire placements that avoid the blocking circuit element. Some such embodiments further operate by, in response to identification of the blocking circuit element, selecting a second routing placement for the first wire from the plurality of updated routing placements based on an improved misalignment value associated with the second routing placement compared with a misalignment value associated with the initial routing placement.

In some such embodiments, the improved misalignment value for the second routing placement is equal to a misalignment value associated with the routing placement (e.g., the two routes are opposing sides of a rectangle with a start at one corner and an end at an opposite corner).

Some embodiments further operate by identifying a plurality of updated routing placements for the first wire prior to selection of the routing placement, and calculating a misalignment value for each routing placement for the first wire of the plurality of updated routing placements, where the routing placement is selected from the plurality of updated routing placements based on a comparison of the misalignment values for each routing placement of the plurality of updated routing placements.

Some embodiments further operate by updating the wire data with the routing placement for the first wire, and in response to updating the wire data with the routing placement for the first wire, further updating the wire data to adjust one or more elements connected to the first wire.

Some embodiments operate to align wires in two different alignment directions, with one or more wires in the second alignment direction aligned by selecting a third wire of the plurality of wires; identifying, using the one or more hardware processors, a fourth wire, wherein the third wire shares the second alignment direction with the fourth wire, wherein a third end of the third wire and a fourth end of the fourth wire are both positioned on a line running along the first alignment direction such that the third wire and the fourth wire are configured to carry the signal from the first circuit element toward the second circuit element along the second alignment direction; calculating, by the one or more hardware processors, a second misalignment value for the third wire and the fourth wire, wherein the second misalignment value is associated with a second distance from the third end of the third wire to the fourth end of the fourth wire along the first alignment direction; and selecting, using the one or more hardware processors, a second routing placement for the third wire based at least in part on the second misalignment value. Some such embodiments further operate by adjusting a length of the third wire to connect the third wire to the first wire when the third wire is in the second routing placement and the first wire is in the routing placement, in order to connect wires in opposite alignment directions after adjustments to wire placements are made.

The alignment check operations can be repeated in some embodiments. For example, in some embodiments, a method includes operations for each wire of the plurality of wires of: determining whether a parent connection to a corresponding parent wire is present; if a parent connection to a parent wire is present, determining whether a misalignment is present between the wire and the parent wire; if a misalignment is present between the wire and the parent wire, determining alternative wire track placements to reduce the misalignment; and then selecting a first alternative wire track placement from the alternative wire track placements.

Following any such embodiments, the updated routing information may be used for any combination of updating the wire data based on the routing placement for the first wire, generating an updated circuit design based on the updating of the wire data, and/or generating a set of masks based on the updated circuit design for use in generating an integrated circuit comprising the first wire with the routing placement.

While particular methods and operations are discussed above, it will be apparent that additional intervening or repeated operations are possible within the scope of the various embodiments described herein. Some circuit designs may include multiple wire networks, and the embodiments described herein may be applied to each wire network. Additionally, other embodiments include the above operations performed in a different order or with intervening operations in order to perform routing track assignments in an EDA computing process and environment.

Figure 10:
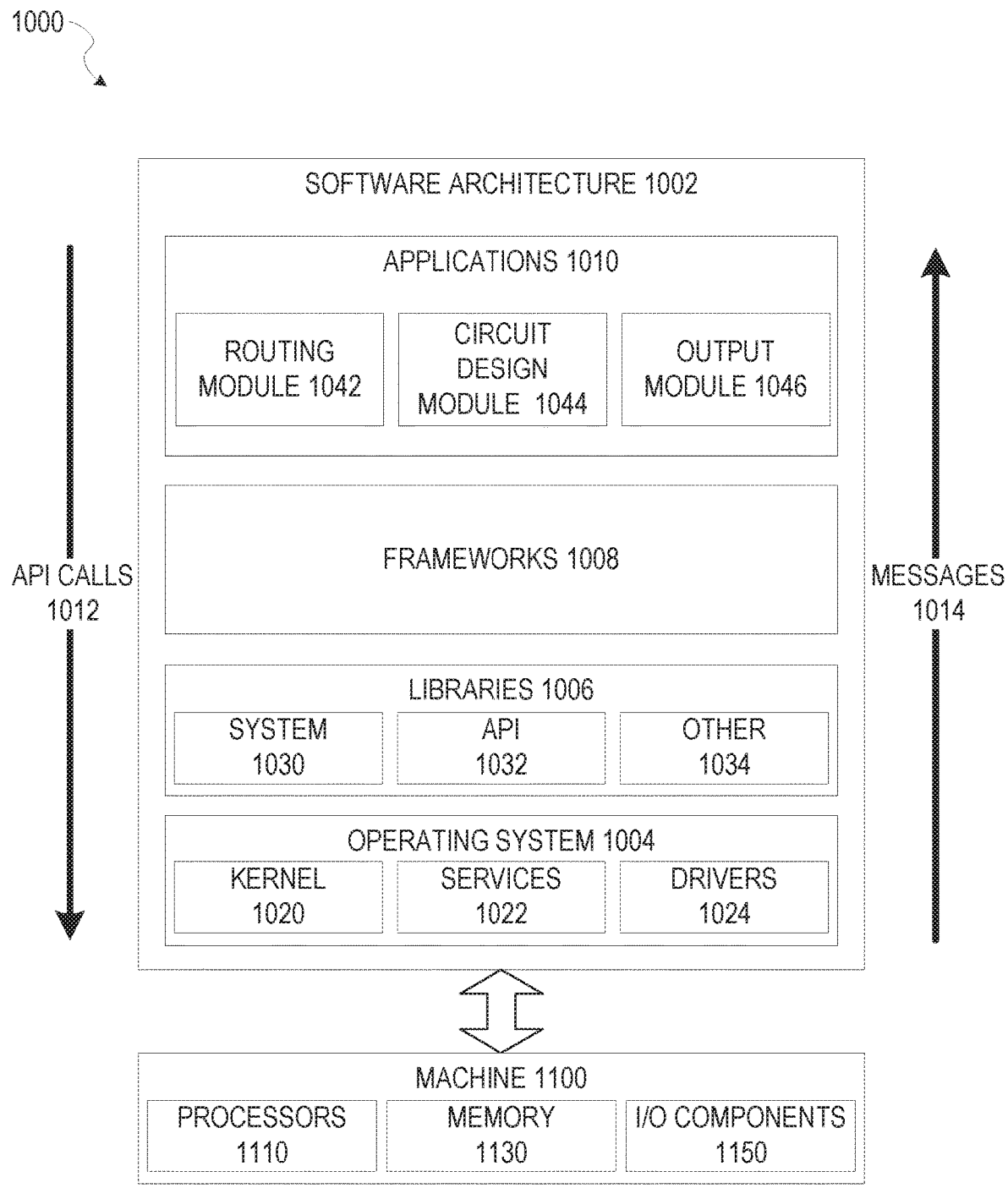
FIG. 10 is a block diagram illustrating an example of a software architecture that may be operating on an electronic design automation (EDA) computer and used with methods for routing track assignment according to some example embodiments.

FIG. 10 is a block diagram 1000 illustrating an example of a software architecture 1002 that may be operating on an EDA computer and used with methods for routing track assignment and circuit design updates and optimization, according to some example embodiments. The software architecture 1002 can be used as an EDA computing device to implement any of the methods described above. Aspects of the software architecture 1002 may, in various embodiments, be used to store circuit designs and execute analysis or optimization in an EDA environment to generate circuit designs, with physical devices generated using these circuit designs.

FIG. 10 is merely a non-limiting example of a software architecture 1002, and it will be appreciated that many other architectures can be implemented to facilitate the functionality described herein. In various embodiments, the software architecture 1002 is implemented by hardware such as a machine 1100 that includes processors 1110, memory 1130, and I/O components 1150. In this example, the software architecture 1002 can be conceptualized as a stack of layers where each layer may provide a particular functionality. For example, the software architecture 1002 includes layers such as an operating system 1004, libraries 1006, software frameworks 1008, and applications 1010. Operationally, the applications 1010 invoke application programming interface (API) calls 1012 through the software stack and receive messages 1014 in response to the API calls 1012, consistent with some embodiments. In various embodiments, any client device, server computer of a server system, or other device described herein may operate using elements of the software architecture 1002. An EDA computing device described herein may additionally be implemented using aspects of the software architecture 1002, with the software architecture 1002 adapted for operating to generate and update routing track assignments for circuit designs in accordance with embodiments described herein.

In one embodiment, an EDA application of the applications 1010 accesses a netlist after track assignment, and updates the netlist to reduce misalignment and improve skew performance, according to embodiments described herein, using various modules within the software architecture 1002. For example, in one embodiment, an EDA computing device similar to the machine 1100 includes the memory 1130 and the one or more processors 1110. The processors 1110 implement a routing module 1042 to analyze and update wire placement. The processors 1110 also implement a circuit design module 1044 that uses the routing placement(s) (e.g. wire placement(s)) from the routing module 1042 to update a circuit design and perform other EDA operations for generation of a circuit design. In other embodiments, any number of EDA modules may be implemented in conjunction with the functionality of the routing module 1042 or integrating the functionality of the routing module 1042 to implement routing track assignment. An output module 1046 outputs a final circuit design including wire placement for use in generating masks or other outputs as part of production of an integrated circuit. In some embodiments, the output module 1046 may then be used to update a display of the I/O components 1150 of the EDA computing device with data associated with routing placement (e.g., presenting routing images such as those shown in FIGS. 8A and 8B or other such routing images).

In various other embodiments, rather than being implemented as modules of one or more applications 1010, some or all of the modules 1042, 1044, and 1046 may be implemented using elements of the libraries 1006 or the operating system 1004.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, signal processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 such as libraries of multi-instance blocks for use in an EDA environment or other libraries that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1006 may also include other libraries 1034.

The software frameworks 1008 provide a high-level common infrastructure that can be utilized by the applications 1010, according to some embodiments. For example, the software frameworks 1008 provide various graphic user interface (GUI) functions, high-level resource management, high-level location services, and so forth. The software frameworks 1008 can provide a broad spectrum of other APIs that can be utilized by the applications 1010, some of which may be specific to a particular operating system 1004 or platform. In various embodiments, the systems, methods, devices, and instructions described herein may use various files, macros, libraries, and other elements of an EDA design environment to implement analysis described herein. This includes analysis of input design files for an integrated circuit design, along with any element of hierarchical analysis that may be used as part of or along with the embodiments described herein. While netlist files, library files, SDC files, and view definition files are examples that may operate within a software architecture 1002, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 1100 including processors 1110), with these operations being accessible via a network (e.g., the Internet) and via one or more appropriate interfaces (e.g., an API). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine 1100, but deployed across a number of machines 1100. In some example embodiments, the processors 1110 or processor-implemented modules are located in a single geographic location (e.g., within a home environment, an office environment, or a server farm). In other example embodiments, the processors 1110 or processor-implemented modules are distributed across a number of geographic locations.

Figure 11:
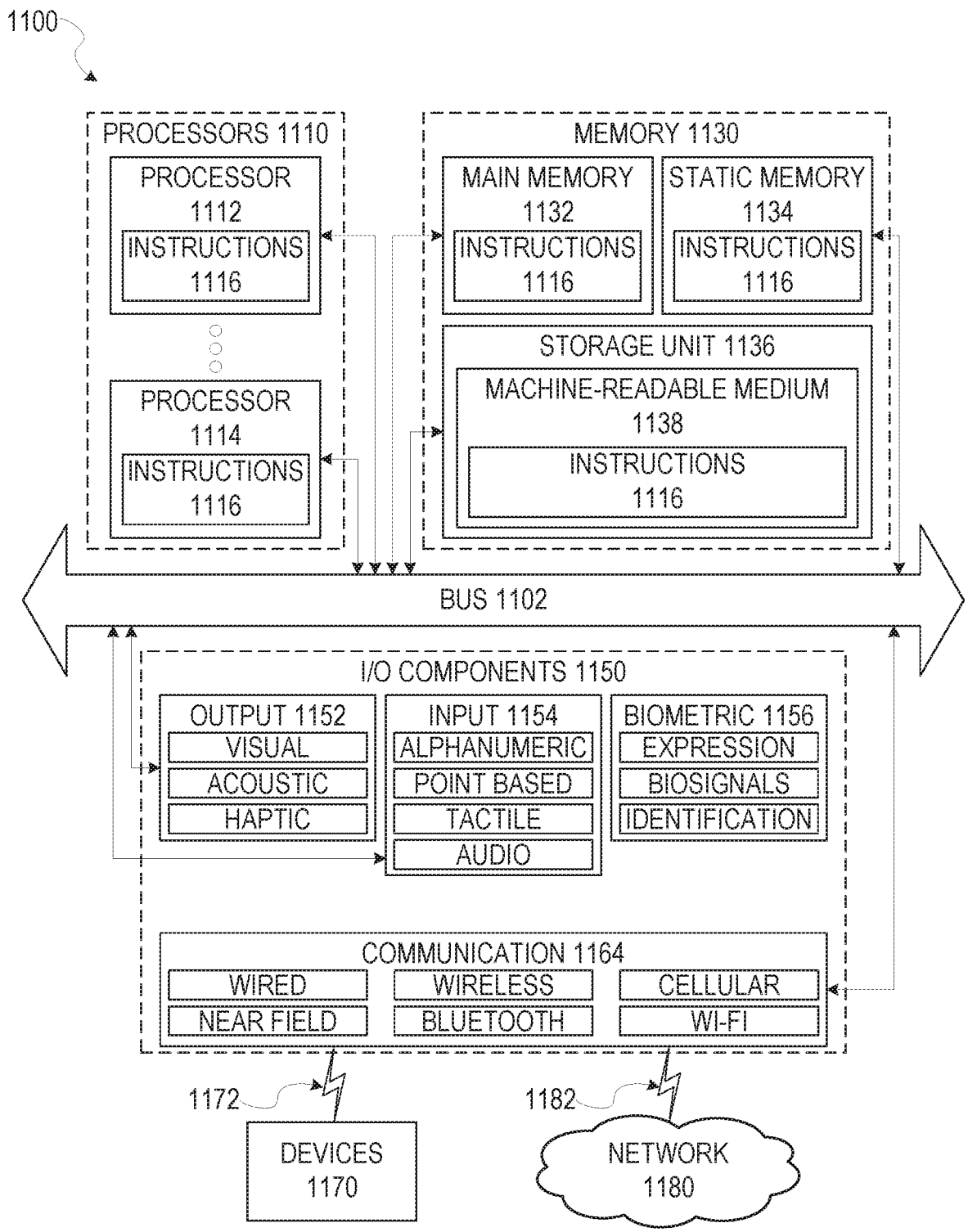
FIG. 11 is a diagrammatic representation of a machine in the form of a computer system within which a set of instructions are executed, causing the machine to perform any one or more of the methodologies discussed herein, according to some example embodiments.

FIG. 11 is a diagrammatic representation of the machine 1100 in the form of a computer system within which a set of instructions may be executed for causing the machine 1100 to perform any one or more of the methodologies discussed herein, according to an example embodiment. FIG. 11 shows components of the machine 1100, which is, according to some embodiments, able to read instructions from a machine-readable medium (e.g., a machine-readable storage medium) and perform any one or more of the methodologies discussed herein. In some embodiments, the machine 1100 may operate with instructions 1116 (e.g., software, a program, an application, an applet, an app, or other executable code) for causing the machine 1100 to perform any one or more of the methodologies discussed. In alternative embodiments, the machine 1100 operates as a standalone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), a media system, a cellular telephone, a smart phone, a mobile device, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 1112 and a processor 1114 that may execute the instructions 1116. The term "processor" is intended to include multi-core processors 1110 that may comprise two or more independent processors 1112, 1114 (also referred to as "cores") that can execute the instructions 1116 contemporaneously. Although FIG. 11 shows multiple processors 1110, the machine 1100 may include a single processor 1112 with a single core, a single processor 1112 with multiple cores (e.g., a multi-core processor 1112), multiple processors 1110 with a single core, multiple processors 1110 with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown, in an example embodiment, to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., the instructions 1116) for execution by a machine (e.g., the machine 1100), such that the instructions, when executed by one or more processors of the machine (e.g., the processors 1110), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like. Biometric components 1156 may also be used as inputs in various embodiments.

In some embodiments, outputs from an EDA computing device may include design documents, files for additional steps in a design flow 100, or outputs for circuit fabrication. In various embodiments, outputs of a timing analysis are used to generate updates and changes to a circuit design, and after a final closure of timing with all associated timing thresholds and design requirements met, circuit design output files are used to generate masks and other physical outputs for generation of a circuit. As described herein, "requirements", "design elements", and other aspects of a circuit design refer to selectable values that are set as part of the design of a circuit. Such design requirements or elements may be adjusted by a system operator or circuit designer to suit the particular goals of a project or circuit that results from the operations described herein.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, the communication components 1164 include wired communication components, wireless communication components, cellular communication components, near-field communication (NFC) components, BLUETOOTH® components (e.g., BLUETOOTH® Low Energy), WI-FI® components, and other communication components to provide communication via other modalities. The devices 1170 may be another machine or any of a wide variety of peripheral devices (e.g., a peripheral device coupled via a USB).

Transmission Medium

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-speed Packet Access (HSPA), Worldwide Interoperability for Microwave Access (WiMAX), Long-Term Evolution (LTE) standard, others defined by various standard-setting organizations, other long-range protocols, or other data transfer technology.

Furthermore, the machine-readable medium 1138 is non-transitory (in other words, not having any transitory signals) in that it does not embody a propagating signal. However, labeling the machine-readable medium 1138 "non-transitory" should not be construed to mean that the machine-readable medium 1138 is incapable of movement; the machine-readable medium 1138 should be considered as being transportable from one physical location to another. Additionally, since the machine-readable medium 1138 is tangible, the machine-readable medium 1138 may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, techniques, instruction sequences, and computing machine program products that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A computerized method for electronic design automation, the method comprising:
   accessing, using one or more hardware processors, wire data for a circuit design, the wire data comprising a plurality of wires, wherein the plurality of wires are aligned on a plurality of tracks to connect a first circuit element in a first position to at least a second circuit element in a second position;
   selecting, using the one or more hardware processors, a first wire of the plurality of wires;
   identifying, using the one or more hardware processors, a second wire, wherein the second wire shares a first alignment direction with the first wire, wherein a first end of the first wire shares a position with a second end of the second wire along a line with a second alignment direction perpendicular to the first alignment direction, such that the first wire and the second wire are configured to carry a signal from the first circuit element toward the second circuit element along the first alignment direction;
   calculating, by the one or more hardware processors, a misalignment value for the first wire and the second wire, wherein the misalignment value is a distance from the first end of the first wire to the second end of the second wire along the second alignment direction;
   selecting, using the one or more hardware processors, a routing placement for the first wire based at least in part on the misalignment value; and
   for each wire of the plurality of wires:
   determining whether a parent connection from the wire to a corresponding parent wire is present;
   if the parent connection to the corresponding parent wire is present, determining whether a misalignment is present between the wire and the corresponding parent wire;
   if the misalignment is present between the wire and the corresponding parent wire, determining alternative wire track placements to reduce the misalignment; and
   selecting a first alternative wire track placement from the alternative wire track placements.

2. The method of claim 1 further comprising determining a second routing placement for the second wire prior to selection of the first wire, wherein the second routing placement is selected to minimizing wire length.

3. The method of claim 1 further comprising:
   storing an updated circuit design using the routing placement for the first wire in a memory coupled to the one or more hardware processors;
   wherein the routing placement for the first wire is selected as part of an initial routing for the circuit design.

4. The method of claim 1 wherein the wire data comprises a netlist with routing placement for the plurality of wires.

5. The method of claim 4 wherein the routing placement for the plurality of wires is generated to minimize wire length as part of a global routing process used to generate the wire data; and
   wherein the routing placement for the first wire based at least in part on the misalignment value is associated with an increased wire length and an improved slew performance value.

6. The method of claim 5 further comprising:
   identifying a blocking circuit element for the routing placement from the circuit design.

7. The method of claim 6 further comprising maintaining an initial placement for the first wire in response to identification of the blocking circuit element.

8. The method of claim 6 further comprising:
   identifying a plurality of updated routing placements for the first wire prior to selection of the routing placement for the first wire; and
   calculating a corresponding misalignment value for each routing placement for the first wire of the plurality of updated routing placements.

9. The method of claim 8 further comprising:
   in response to identification of the blocking circuit element, selecting a second routing placement for the first wire from the plurality of updated routing placements based on an improved misalignment value associated with the second routing placement compared with the misalignment value associated with the routing placement.

10. The method of claim 9 wherein the improved misalignment value associated with the second routing placement is equal to the misalignment value associated with the routing placement.

11. The method of claim 1 further comprising:
identifying a plurality of updated routing placements for the first wire prior to selection of the routing placement; and
calculating a corresponding misalignment value for each routing placement for the first wire of the plurality of updated routing placements;
wherein the routing placement is selected from the plurality of updated routing placements based on a comparison of the corresponding misalignment values for each routing placement of the plurality of updated routing placements.

12. The method of claim 1 further comprising:
updating the wire data with the routing placement for the first wire; and
in response to updating the wire data with the routing placement for the first wire, further updating the wire data to adjust one or more elements connected to the first wire.

13. The method of claim 1 further comprising:
selecting, using the one or more hardware processors, a third wire of the plurality of wires;
identifying, using the one or more hardware processors, a fourth wire, wherein the third wire shares the second alignment direction with the fourth wire, wherein a third end of the third wire and a fourth end of the fourth wire are both positioned on a line running along the first alignment direction such that the third wire and the fourth wire are configured to carry the signal from the first circuit element toward the second circuit element along the second alignment direction;
calculating, by the one or more hardware processors, a second misalignment value for the third wire and the fourth wire, wherein the second misalignment value is associated with a second distance from the third end of the third wire to the fourth end of the fourth wire along the first alignment direction; and
selecting, using the one or more hardware processors, a second routing placement for the third wire based at least in part on the second misalignment value.

14. The method of claim 13 further comprising adjusting a length of the third wire to connect the third wire to the first wire when the third wire is in the second routing placement and the first wire is in the routing placement.

15. The method of claim 1 further comprising:
updating the wire data based on the routing placement for the first wire;
generating an updated circuit design based on the updating of the wire data; and
generating a set of masks based on the updated circuit design for use in generating an integrated circuit comprising the first wire with the routing placement.

16. A device for generating wire data for a circuit design, the device comprising:
memory configured to store wire data for a circuit design, the wire data comprising a plurality of wires, wherein the plurality of wires are aligned on a plurality of tracks to connect a first circuit element in a first position to at least a second circuit element in a second position;
one or more processors coupled to the memory and configured to:
access the wire data for the circuit design;
select a first wire of the plurality of wires;
identify a second wire of the plurality of wires, wherein the second wire shares a first alignment direction with the first wire, wherein a first end of the first wire shares a position with a second end of the second wire along a line with a second alignment direction perpendicular to the first alignment direction, such that the first wire and the second wire are configured to carry a signal from the first circuit element toward the second circuit element along the first alignment direction;
calculate a misalignment value for the first wire and the second wire, wherein the misalignment value is a distance from the first end of the first wire to the second end of the second wire along the second alignment direction;
select a routing placement for the first wire based at least in part on the misalignment value;
select a third wire of the plurality of wires;
identify a fourth wire, wherein the third wire shares the second alignment direction with the fourth wire, wherein a third end of the third wire and a fourth end of the fourth wire are both positioned on a line running along the first alignment direction such that the third wire and the fourth wire are configured to carry the signal from the first circuit element toward the second circuit element along the second alignment direction;
calculate a second misalignment value for the third wire and the fourth wire, wherein the second misalignment value is associated with a second distance from the third end of the third wire to the fourth end of the fourth wire along the first alignment direction; and
select a second routing placement for the third wire based at least in part on the second misalignment value;
wherein the memory is further configured to store an updated circuit design using the routing placement for the first wire and the second routing placement for the third wire in the memory.

17. The device of claim 16 wherein the misalignment value is based, at least in part, on a length of the first wire.

18. A non-transitory computer readable medium comprising instructions that, when executed by one or more processors of a device, cause the device to perform operations comprising:
accessing wire data for a circuit design, the wire data comprising a plurality of wires, wherein the plurality of wires are aligned on a plurality of tracks to connect a first circuit element in a first position to at least a second circuit element in a second position;
selecting a first wire of the plurality of wires;
identifying a second wire, wherein the second wire shares a first alignment direction with the first wire, wherein a first end of the first wire shares a position with a second end of the second wire along a line with a second alignment direction perpendicular to the first alignment direction, such that the first wire and the second wire are configured to carry a signal from the first circuit element toward the second circuit element along the first alignment direction;
calculating a misalignment value for the first wire and the second wire, wherein the misalignment value is a distance from the first end of the first wire to the second end of the second wire along the second alignment direction;
for each wire of the plurality of wires:
determining whether a parent connection to a corresponding parent wire is present;

if the parent connection to the corresponding parent wire is present, determining whether a misalignment is present between the wire and the corresponding parent wire;

if the misalignment is present between the wire and the corresponding parent wire, determining alternative wire track placements to reduce the misalignment; and selecting a first alternative wire track placement from the alternative wire track placements;

selecting, using the one or more hardware processors, a routing placement for the first wire based at least in part on the misalignment value and the first alternative wire track placement; and outputting an updated circuit design comprising the routing placement for the first wire to a display of the device.

19. The non-transitory computer readable medium of claim 18 wherein the instructions further cause the one or more processors to perform operations comprising:

determining, prior to selection of the first wire, that the first wire has a first wire length less than a threshold wire length, wherein the first wire is selected in response to the determination that the first wire length is less than the threshold wire length.

20. The non-transitory computer readable medium of claim 18, wherein the wire data comprises a netlist with routing placement for the plurality of wires;

wherein the routing placement for the plurality of wires is generated to minimize wire length as part of a global routing process used to generate the wire data; and wherein the routing placement for the first wire based at least in part on the misalignment value is associated with an increased wire length and an improved slew performance value.

\* \* \* \* \*